United States Patent
Fontaine

(10) Patent No.: US 8,974,299 B1
(45) Date of Patent: *Mar. 10, 2015

(54) METRIC BASED CONFORMANCE BY CHARACTER UNITS TO SPECIFIED FORMATIONS

(71) Applicant: Kabam, Inc., San Francisco, CA (US)

(72) Inventor: Thomas Fontaine, San Mateo, CA (US)

(73) Assignee: Kabam, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/331,156

(22) Filed: Jul. 14, 2014

Related U.S. Application Data

(63) Continuation of application No. 13/678,359, filed on Nov. 15, 2012, now Pat. No. 8,790,178.

(51) Int. Cl.
*A63F 9/24* (2006.01)
*A63F 13/00* (2014.01)

(52) U.S. Cl.
CPC .......................... *A63F 13/00* (2013.01)
USPC ....................... 463/31; 463/4; 463/9

(58) Field of Classification Search
USPC ................. 463/4, 9, 30–31, 40–43
See application file for complete search history.

(56) References Cited

U.S. PATENT DOCUMENTS

| | | | | |
|---|---|---|---|---|
| 6,149,520 | A * | 11/2000 | Takatsuka | 463/4 |
| 6,428,411 | B1 * | 8/2002 | Togami | 463/4 |
| 6,454,653 | B1 * | 9/2002 | Kawazu | 463/43 |
| 6,525,736 | B1 | 2/2003 | Erikawa et al. | 345/473 |
| 6,729,954 | B2 | 5/2004 | Atsumi et al. | 463/7 |
| 6,870,537 | B2 | 3/2005 | Kikuchi et al. | 345/474 |
| 7,390,254 | B2 | 6/2008 | Hirai | 463/4 |
| 7,452,268 | B2 | 11/2008 | Annunziata | 463/1 |
| 7,785,198 | B2 | 8/2010 | Kando | 463/30 |
| 8,096,863 | B2 | 1/2012 | Annunziata | 463/1 |
| 8,182,341 | B2 | 5/2012 | Shioda et al. | 463/36 |
| 8,790,178 | B1 * | 7/2014 | Fontaine | 463/31 |
| 2002/0045470 | A1 | 4/2002 | Atsumi et al. | 463/1 |
| 2004/0029625 | A1 | 2/2004 | Annunziata | 463/1 |
| 2004/0166914 | A1 * | 8/2004 | Ishihata et al. | 463/2 |
| 2004/0248631 | A1 * | 12/2004 | Hirai | 463/4 |
| 2004/0259616 | A1 * | 12/2004 | Hirai | 463/4 |
| 2005/0009602 | A1 * | 1/2005 | Nishimura | 463/30 |
| 2005/0221880 | A1 * | 10/2005 | Kando | 463/9 |
| 2006/0135237 | A1 | 6/2006 | Tsuda | 463/9 |
| 2006/0246974 | A1 | 11/2006 | Tsuda et al. | 463/7 |
| 2009/0069086 | A1 | 3/2009 | Shioda et al. | 463/36 |
| 2012/0052950 | A1 | 3/2012 | Kataoka et al. | 463/36 |

* cited by examiner

*Primary Examiner* — Milap Shah
(74) *Attorney, Agent, or Firm* — Pillsbury Winthrop Shaw Pittman LLP

(57) ABSTRACT

An approach to facilitating metric-based conformance by character units to specified formations is provided. An instance of a game space may be executed. The game space may have character units (including a first group of character units) that are controllable by a user to perform in-space actions. Values for one or more dynamic cohesiveness metrics associated with one or more of the user or character units of the first group may be determined. Responsive to reception of a first action request specifying a formation for the first group and a second action request specifying a first in-space objective for the first group, the first group may attempt to perform the first in-space objective in the instance of the game space with a level of conformance (that is based on the determined values of the dynamic cohesiveness metrics) to the specified formation during the attempted performance of the first in-space objective.

16 Claims, 4 Drawing Sheets

METRIC BASED CONFORMANCE BY CHARACTER UNITS TO SPECIFIED FORMATIONS

CLAIM OF PRIORITY

This application is a continuation of U.S. patent application Ser. No. 13/678,359, filed on Nov. 15, 2012 and issued as U.S. Pat. No. 8,790,178 on Jul. 29, 2014, which are hereby incorporated by reference herein in their entirety.

FIELD OF THE DISCLOSURE

This disclosure relates generally to metric-based conformance by character units to specified formations. For example, conformance by a group of character units to a specified formation may be based on values of dynamic cohesiveness metrics associated with a user and/or character units of the group.

BACKGROUND

Many modern games include character units (e.g., ground units, air units, etc.) that can be selected by a user to perform one or more objectives in a game. For example, a user may select a plurality of character units and command those character units to travel to a destination point, destroy an enemy base, etc. Typically, however users maintain a desired relative positioning of the character units by manually repositioning the character units to the desired positions since character units generally tend to break from a manual user-maintained formation while carrying out objectives that require movement of the character units. Such manual repositioning of the character units is often burdensome, reduces a user's attention from other tasks, and/or negatively impacts user experience in other ways. These and other drawbacks exist with such typical games.

SUMMARY

One aspect of the disclosure relates to a system configured to facilitate metric-based conformance by character units to specified formations, in accordance with one or more implementations. In exemplary implementations, a group of character units may attempt to perform an in-space objective in an instance of a game space with a level of conformance to a specified formation during the attempted performance of the in-space objective. The level of the conformance to the specified formation may be based on values of dynamic cohesiveness metrics associated with the user and/or character units of the group. For example, the dynamic cohesiveness metrics may include one or more of experience, fatigue, loyalty, morale, or happiness. In this way, user experience may be improved by reducing burden associated with manual repositioning of character units, allowing more time for users to focus their attention on tasks other than repositioning of character units, adopting realistic formation-related aspects for the user experience, and/or providing other benefits.

In some implementations, the system may include one or more servers. The server(s) may be configured to communicate with one or more client computing platforms according to a client/server architecture. The users may access the system via the client computing platforms, for instance, to interact with one or more services.

The server(s) may be configured to execute one or more computer program modules to facilitate metric-based conformance by character units to specified formations. The computer program modules may include one or more of a game module, a character unit manager module, a communication module, a formation manager module, and/or other modules. It is noted that, in some implementations, the client computing platforms may be configured to execute one or more computer program modules that are the same as or similar to the computer program modules of the server(s) to facilitate metric-based conformance by character units to specified formations.

The game module may be configured to execute an instance of a game space. The game space may include character units that are controllable by a user to perform in-space actions that are selected by the user. In certain implementations, the game module may be configured such that grouping of the character units may be user selectable. The game module may be configured such that one or more of the character units are grouped into a first group of character units based on a selection of the first group of character units by the user.

The character unit manager module may be configured to determine values for one or more dynamic cohesiveness metrics associated with one or more of the user or character units of the first group. By way of example, the dynamic cohesiveness metrics may include one or more of experience, fatigue, loyalty, morale, or happiness. Values of these and/or other dynamic cohesiveness metrics may, for instance, affect the level of conformance to specified formations during attempted performance of in-space objectives.

The communication module may be configured to obtain action requests from one or more users that specify in-space actions. The in-space actions may include a first action request specifying a formation for the first group of character units and a second action request specifying a first in-space objective for the first group of character units. The first and second action requests may, for instance, be inputted by the user to cause the first group of character units to attempt the first in-space objective while conforming to the specified formation.

In various implementations, the game module may be configured such that, responsive to reception of the first and second action requests, the first group of character units may attempt to perform the first in-space objective in the instance of the game space with a level of conformance to the specified formation during the attempted performance of the first in-space objective that is based on the determined values of the dynamic cohesiveness metrics. In some implementations, the game module may be configured to maintain, based on the determined values of the dynamic cohesiveness metrics, the conformance to the specified formation by the first group of character units during the attempted performance of the first in-space objective.

In some implementations, the level of conformance to the specified formation during the attempted performance may be based on values of other cohesiveness metrics such as non-dynamic cohesiveness metrics (e.g., static cohesiveness metrics) associated with the user and/or character units of the first group. Non-dynamic cohesiveness metrics may include race, faction, class, and/or other non-dynamic cohesiveness metrics. Conformance to the specified formation by the first group of character units may, for instance, be based on values associated with the non-dynamic cohesiveness metrics and values of the dynamic cohesiveness metrics.

In certain implementations, the game module may be configured to facilitate temporary breaking of the conformance to the specified formation by individuals ones of the first group of character units. In some implementations, the temporary breaking of the conformance to the specified formation may be based on one or more of a terrain type encountered by the first group of character units, an objective type of the first in-space objective, a sub-objective of the first in-space objective, an effect on the first group of character units, a new objective assigned to a character unit of the first group, or proximity to a target of the first group of character units.

The formation manager module may be configured to manage definitions of one or more formations. The definitions may include first and second definitions. The first definition may indicate a first difficulty level associated with conforming to the specified formation. The second definition may indicate a second difficulty level associated with conforming to another formation that is different from the first difficulty level. In some implementations, the game module may be configured such that the conformance to the specified formation is maintained for the first group of character units based on the first difficulty level.

In various implementations, the formation manager module may be configured such that the first definition indicates one or more of positions, spacing, or angles of character units with respect to one another for the specified formation. In some implementations, the game module may be configured such that the conformance to the specified formation is maintained for the first group of character units based on one or more of the positions, the spacing, or the angles.

These and other features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
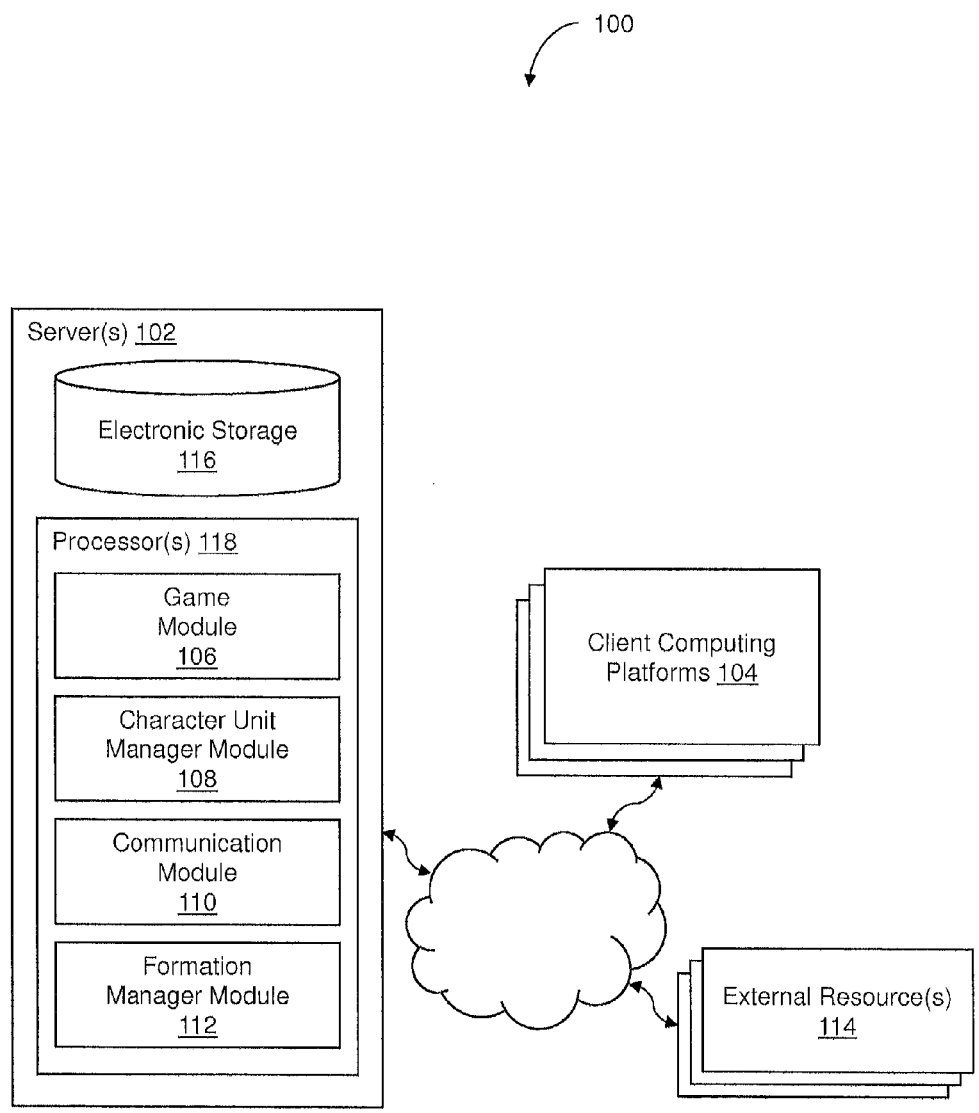
FIG. 1 illustrates a system configured to facilitate metric-based conformance by character units to specified formations, in accordance with one or more implementations.

FIG. 1 illustrates a system 100 configured to facilitate metric-based conformance by character units to specified formations, in accordance with one or more implementations. In exemplary implementations, a group of character units may attempt to perform an in-space objective in an instance of a game space with a level of conformance to a specified formation during the attempted performance of the in-space objective. The level of the conformance to the specified formation may be based on values of dynamic cohesiveness metrics associated with the user and/or character units of the group. As used herein, "formation" of a group of characters or other objects may refer to the relative positioning of the individual characters or objects with respect to the other individual characters or objects, the relative angles that the individual characters or objects face with respect to the other individual characters or objects, an overall shape or pattern, and/or other aspects of the alignment of the characters or other objects. For example, the dynamic cohesiveness metrics may include one or more of experience, fatigue, loyalty, morale, or happiness. In this way, user experience may be improved by reducing burden associated with manual repositioning of character units, allowing more time for users to focus their attention on tasks other than repositioning of character units, adopting realistic formation-related aspects for the user experience, and/or providing other benefits.

In some implementations, system 100 may include one or more servers 102. Server(s) 102 may be configured to communicate with one or more client computing platforms 104 according to a client/server architecture. The users may access system 100 via client computing platforms 104, for instance, to interact with one or more services.

Server(s) 102 may be configured to execute one or more computer program modules to facilitate metric-based conformance by character units to specified formations. The computer program modules may include one or more of a game module 106, a character unit manager module 108, a communication module 110, a formation manager module 112, and/or other modules. As noted, in some implementations, client computing platforms 104 may be configured to execute one or more computer program modules that are the same as or similar to the computer program modules of server(s) 102 to facilitate metric-based conformance by character units to specified formations.

Game module 106 may be configured to execute an instance of a game space. The game space may include character units that are controllable by a user to perform in-space actions that are selected by the user. In some implementations, the game space may be a virtual space. An instance of the game space may be an instance of the virtual space. An instance of the virtual space may be executed by computer modules to determine views of the virtual space. The views may then be communicated (e.g., via streaming, via object/position data, and/or other information) from server(s) 102 and/or other source to client computing platforms 104 for presentation to users. The view determined and transmitted to a given client computing platform 104 may correspond to a user character being controlled by a user via client computing platform 104. The view determined and transmitted to a given client computing platform 104 may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may comprise a simulated space that is accessible by users via clients (e.g., client computing platforms 104) that present the views of the virtual space to a user. The simulated space may have a topography, express ongoing real-time interaction by one or more users, and/or include one or more objects positioned within the topography that are capable of locomotion within the topography. In some instances, the topography may include a 2-dimensional topography. In other instances, the topography may include a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which views of the virtual space are provided is not intended to be limiting. The virtual space may be expressed in a more limited, or more rich, manner. For example, views determined for the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space, users may control characters, objects, simulated physical phenomena (e.g., wind, rain, earthquakes, and/or other phenomena), and/or other elements within the virtual space to interact with the virtual space and/or one another. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or commands input by the users through client computing platforms 104. The users may interact with one another through communications exchanged within the virtual space. Such communications may include one or more of textual chat, instant messages, private messages, voice communications, and/or other communications. Communications may be received and entered by the users via their respective client computing platforms 104. Communications may be routed to and from the appropriate users through server(s) 102.

In certain implementations, game module 106 may be configured such that grouping of the character units may be user selectable. Game module 106 may be configured such that one or more of the character units are grouped into a first group of character units based on a selection of the first group of character units by the user. For example, in one scenario, various ground units, mechanic units, air units, and/or other types of units within a particular region of the game may be presented to the user via a touch display on the user's mobile device (e.g., client computing platform 104). The user may utilize the touch display to perform a "grouping" gesture by drawing circles around various character units that the user wants to include in a group. After drawing the circles, the user may confirm that the character units within the circles should be included as part of the same group. It should be noted that, in some implementations, a character unit may be part of one or more groups. For instance, the user may assign a particular character unit to several groups. The particular character unit may ignore and/or follow instructions given by the user to each of its assigned groups based on the recency of the instructions (e.g., follow the most recent instruction, ignore older instructions that are contrary to the most recent instruction, etc.), priority of the instructions, and/or other criteria.

In another scenario, the user may utilize a "grouping" interface to select character units to cause grouping of those character units into a group. The grouping interface may, for instance, enable the user to input a composition of character units for a particular group (e.g., a percentage of each unit type, a number of each unit type, etc., to be placed the group). As such, the group may be formed based on the inputted composition. In some scenarios, when certain character units of the group become injured, incapacitated, killed, or otherwise unavailable, new units of the same types as the character units that have become unavailable may automatically be added to the group, for instance, so that the group continues to maintain the user-inputted composition.

Character unit manager module 108 may be configured to determine values for one or more dynamic cohesiveness metrics associated with one or more of the user or character units of the first group. By way of example, the dynamic cohesiveness metrics may include one or more of experience, fatigue, loyalty, morale, or happiness. Values of these and/or other dynamic cohesiveness metrics may, for instance, affect the level of conformance to specified formations during attempted performance of in-space objectives. In one use case, users may be associated with various levels of experience. A user with little experience may be a low-level user (e.g., level-1 user), while a user with more experience may be a higher-level user (e.g., level-10 user). For instance, a level-10 user may have completed more in-space objectives of more objective types than a level-1 user. Based on the greater level of experience, character units of the level-10 user may be more likely to have greater conformance to a specified formation for performing a specified in-space objective than character units of the level-1 user. Thus, increases in the experience level of a user may result in a greater level of conformance to a specified formation during attempted performance of an in-space objective.

In another use case, high levels of fatigue of character units may cause the character units to be less likely to conform to a specified formation during attempted performance of an in-space objective. For example, character units that have been well-rested may be more likely to conform to a specified formation during attempted performance of an in-space objective than character units that have recently participated in several battles without sufficient rest. Nonetheless, character units with high levels of fatigue may, for instance, gradually decrease their fatigue levels by resting in between strenuous in-space objectives (e.g., battles, marches, training, etc.).

In another use case, loyalty levels of character units of a group to a group leader and/or to one another may increase as those character units continue to perform in-space objectives together. Morale levels of character units may increase when those character units successfully complete in-space objectives (e.g., battles, marches, training, etc.). Morale levels of character units may decrease when those character units fail to complete in-space objectives. Happiness levels of character units may increase and/or decrease based on the tax rate charged to the character units, availability of food for the character units, and/or other factors. Level of conformance of character units to specified formations during attempted performance of in-space objectives may, for instance, be based on the loyalty levels, morale levels, happiness levels, and/or other dynamic cohesiveness metrics.

Communication module 110 may be configured to obtain action requests from one or more users that specify in-space actions. The in-space actions may include a first action request specifying a formation for the first group of character units and a second action request specifying a first in-space objective for the first group of character units. The first and second action requests may, for instance, be inputted by the user to cause the first group of character units to attempt the first in-space objective while conforming to the specified formation.

Figure 2:
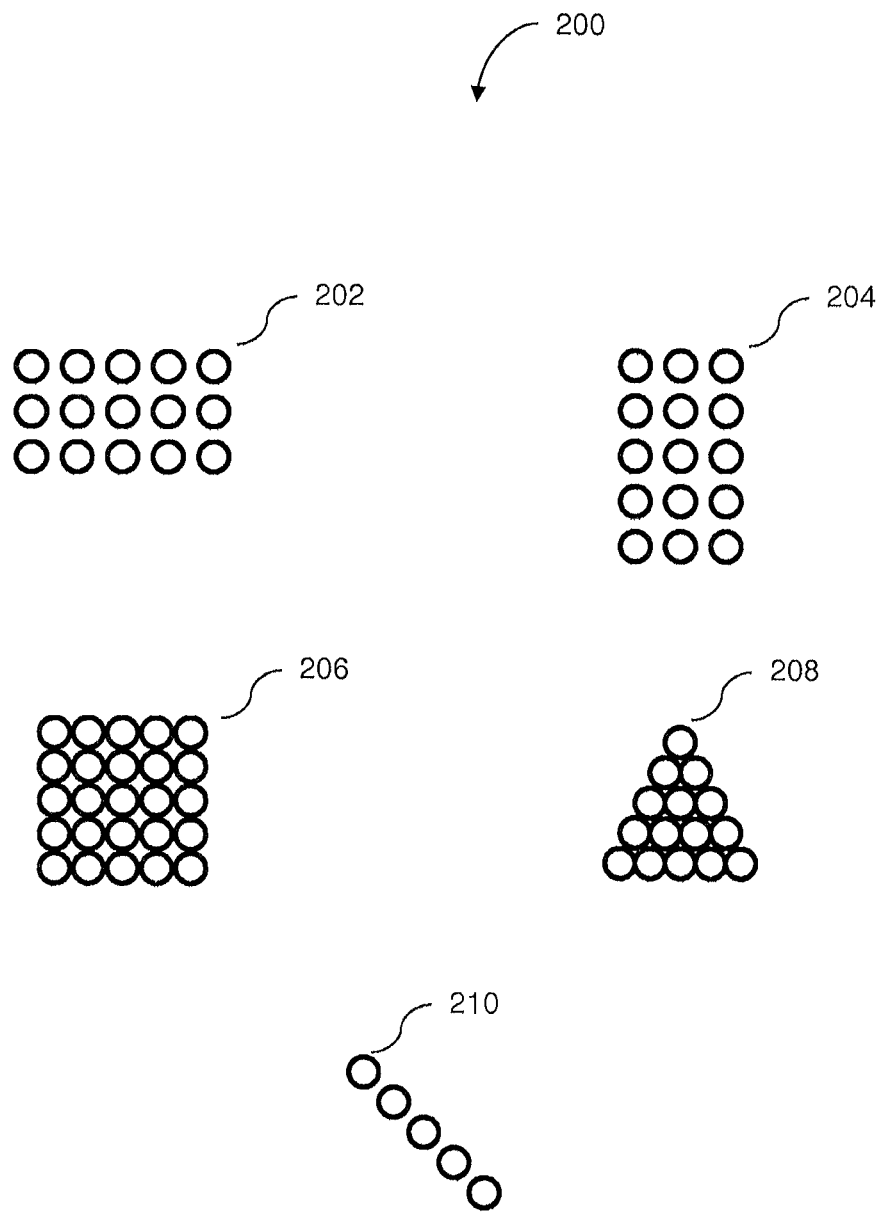
FIG. 2 illustrates various formations of character units, in accordance with one or more implementations.

By way of example, FIG. 2 illustrates various formations of character units, in accordance with one or more implementations. Character units (e.g., represented by circles) may, for instance, be instructed to engage a line formation 202, a column formation 204, a square formation 206, a wedge formation 208, an echelon formation 210, and/or other formations. In one scenario, line formation 202 may be a tactical formation that provides frontage for volley fire, while sacrificing maneuverability and defense against cavalry. Column formation 204 may be a tactical formation that provides rapid movement and maneuverability, but may limit the number of weapons that can be utilized at a time. Square formation 206 may be a tactical formation to arrange for tactical concentration of force. Wedge formation 208 may be a tactical formation to cut through and/or divide opposition forces. Echelon formation 210 may be a tactical formation that provides a group of character units in echelon formation 210 a greater range of vision and/or the ability to move opposition forces to the left or the right (e.g., depending on the direction of the echelon).

In various implementations, game module 106 may be configured such that, responsive to reception of the first and second action requests, the first group of character units may attempt to perform the first in-space objective in the instance of the game space with a level of conformance to the specified formation during the attempted performance of the first in-space objective that is based on the determined values of the dynamic cohesiveness metrics. In some implementations, game module 106 may be configured to maintain, based on the determined values of the dynamic cohesiveness metrics, the conformance to the specified formation by the first group of character units during the attempted performance of the first in-space objective.

By way of example, when the user specifies a formation and an in-space objective (e.g., via the first and second action requests) for the first group of character units, values of the dynamic cohesiveness metrics may be determined, and the first group of character units may attempt to perform the in-space objective in the specified formation. However, the level of conformance to the specified formation during the attempted performance may be based on the determined values of the dynamic cohesiveness metrics. In certain implementations, the values of the dynamic cohesiveness metrics may continuously be determined (e.g., periodically, in response to a user requested recalculation, etc.) during the attempted performance. In some implementations, the level of conformance to the specified formation during the attempted performance may change during the attempted performance based on new determined values of the dynamic cohesiveness metrics that are calculated during the attempted performance.

As indicated, for example, values of the dynamic cohesiveness metrics associated with the user and/or character units of the first group may change based on one or more factors. These factors may, for instance, include completion of in-space objectives by a user via character units of the user, amount of rest that character units take between attempted performances of in-space objectives, the frequency of attempted performances of in-space objectives by character units, time that character units spend with one another performing in-space objectives, success/failure of in-space objectives by character units, tax rate charged to character units, availability of food for character units, and/or other factors.

In some implementations, the level of conformance to the specified formation during the attempted performance may be based on values of other cohesiveness metrics such as non-dynamic cohesiveness metrics associated with the user and/or character units of the first group. Non-dynamic cohesiveness metrics may include race, faction, class, and/or other non-dynamic cohesiveness metrics. By way of example, a group of character units may include character units of different races, factions, and/or classes. If, for instance, the group of character units include character units of certain races that do not cooperate well with one another, the level of conformance to the specified formation may be negatively affected (e.g., decreased level of conformance). On the other hand, if the group of character units includes character units of certain races that cooperate well with one another, the level of conformance to the specified formation may be positively affected (e.g., increased level of conformance). Conformance to the specified formation by the first group of character units may, for instance, be based on values associated with the non-dynamic cohesiveness metrics and values of the dynamic cohesiveness metrics.

In certain implementations, game module 106 may be configured to facilitate temporary breaking of the conformance to the specified formation by individuals ones of the first group of character units. In some implementations, the temporary breaking of the conformance to the specified formation may be based on one or more of a terrain type encountered by the first group of character units, an objective type of the first in-space objective, a sub-objective of the first in-space objective, an effect on the first group of character units (e.g., injuries, casualties, gains, etc., to character units of the first group), a new objective assigned to a character unit of the first group, or proximity to a target of the first group of character units.

By way of example, with respect to FIG. 2, a rocky terrain encountered by the first group of character units in line formation 202 may trigger individual character units of the first group to temporarily break line formation 202 to avoid obstacles of the rocky terrain. However, when the first group of character units has passed the obstacles, line formation 202 may be reestablished to carry out a specified in-space objective. As another example, when the first group of character units is instructed to perform a patrol march an area using a specified formation, the first group of character units may be less inclined to temporarily break from the specified formation, for instance, despite encountering an enemy. On the other hand, when the first group of character units is instructed to attack the enemy, the first group of character units may temporarily break from the specified formation to optimize their attack positions.

As another example, when the first group of character units is engaging in combat in line formation 202, a significantly injured character unit in the front line may move out of its formation position in order to fall back into one of the back lines to avoid death. As another example, when the first group of character units is instructed to perform a patrol march in a particular area using a specified formation, one of the individual character units in the first group may subsequently be instructed by the user to perform scouting of an unknown area. As such, the individual character unit of the first group may leave its formation position to perform the scouting of the unknown area. Upon completing the scouting mission, however, the individual character unit may return to the first group to reestablish the specified formation.

Formation manager module 112 may be configured to manage definitions of one or more formations. The definitions may include first and second definitions. The first definition may indicate a first difficulty level associated with conforming to the specified formation. The second definition may indicate a second difficulty level associated with conforming to another formation that is different from the first difficulty level. In some implementations, game module 106 may be configured such that the conformance to the specified formation is maintained for the first group of character units based on the first difficulty level. For example, with respect to FIG. 2, echelon formation 210 may be associated with a higher level of difficulty than wedge formation 208. In one use case, for instance, the first group of character units in echelon formation 210 may perform an in-space objective with a 70% level of conformance to echelon formation 210, while a second group of character units having similar dynamic cohesiveness metric values may perform the same in-space objective with a 85% level of conformance to wedge formation 208.

In various implementations, formation manager module 112 may be configured such that the first definition indicates one or more of positions, spacing, or angles of character units with respect to one another for the specified formation. In some implementations, game module 106 may be configured such that the conformance to the specified formation is maintained for the first group of character units based on one or more of the positions, the spacing, or the angles. By way of example, as shown in FIG. 2, various formations 202, 204, 206, 208, 210, and/or other formations may be defined by different sets of positions, spacing, angles, and/or criteria. For instance, square and wedge formations 206 and 208 may be more tightly packed than line, column, and echelon formations 202, 204, and 210. As such, there may be less spacing between character units of a group in square and wedge formations 206 and 208 than between character units of a group in line, column, and echelon formations 202, 204, and 210.

Server(s) 102, client computing platforms 104, external resources 114, and/or other components may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platforms 104, external resources 114, and/or other components may be operatively linked via some other communication media.

A given client computing platform 104 may include one or more processors configured to execute computer program modules. The computer program modules may be configured to enable an expert or user associated with client computing platform 104 to interface with system 100 and/or external resources 114, and/or provide other functionality attributed herein to client computing platforms 104. By way of non-limiting example, client computing platform 104 may include one or more of a desktop computer, a laptop computer, a handheld computer, a netbook, a smartphone, a gaming console, and/or other computing platforms.

External resources 114 may include sources of information, hosts and/or providers of virtual spaces outside of system 100, external entities participating with system 100, and/or other resources. In some implementations, some or all of the functionality attributed herein to external resources 114 may be provided by resources included in system 100.

In some implementations, server(s) 102 may include an electronic storage 116, one or more processor(s) 118, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 116 may include electronic storage media that electronically stores information. In some implementations, the electronic storage media of electronic storage 116 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 116 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 116 may include one or more virtual storage resources (e.g., cloud storage, a virtual private network, and/or other virtual storage resources). Electronic storage 116 may store software algorithms, information determined by processor(s) 118, information received from server(s) 102, information received from client computing platforms 104, and/or other information that enables server(s) 102 and/or client computing platforms 104 to function as described herein. It should be noted that, in certain implementations, electronic storage 116 may be a part of server(s) 102, a part of a given client computing platform 104, and/or a separate component of system 100.

In some implementations, processor(s) 118 is configured to provide information processing capabilities in server(s) 102. As such, processor(s) 118 may include one or more of a digital processor, an analog processor, a digital circuit designed to process information, an analog circuit designed to process information, a state machine, and/or other mechanisms for electronically processing information. Although processor(s) 118 is shown in FIG. 1 as a single entity, this is for illustrative purposes only. In some implementations, processor(s) 118 may include a plurality of processing units. These processing units may be physically located within the same device, or processor(s) 118 may represent processing functionality of a plurality of devices operating in coordination. Processor(s) 118 may be configured to execute modules 106, 108, 110, 112, and/or other modules. Processor(s) 118 may be configured to execute modules 106, 108, 110, 112, and/or other modules by software; hardware; firmware; some combination of software, hardware, and/or firmware; and/or other mechanisms for configuring processing capabilities on processor(s) 118. As noted, in certain implementations, a given client computing platform 104 may include one or more computer program modules that is the same as or similar to the computer program modules of server(s) 102. Client computing platform 104 may include one or more processors that are the same or similar to processor(s) 118 of server(s) 102 to execute such computer program modules of client computing platform 104.

It should be appreciated that although modules 106, 108, 110, and 112 are illustrated in FIG. 1 as being co-located within a single processing unit, in implementations in which processor(s) 118 includes multiple processing units, one or more of modules 106, 108, 110, and/or 112 may be located remotely from the other modules. The description of the functionality provided by the different modules 106, 108, 110, and/or 112 described below is for illustrative purposes, and is not intended to be limiting, as any of modules 106, 108, 110, and/or 112 may provide more or less functionality than is described. For example, one or more of modules 106, 108, 110, and/or 112 may be eliminated, and some or all of its functionality may be provided by other ones of modules 106, 108, 110, and/or 112. As another example, processor(s) 118 may be configured to execute one or more additional modules that may perform some or all of the functionality attributed below to one of modules 106, 108, 110, and/or 112.

Figure 3:
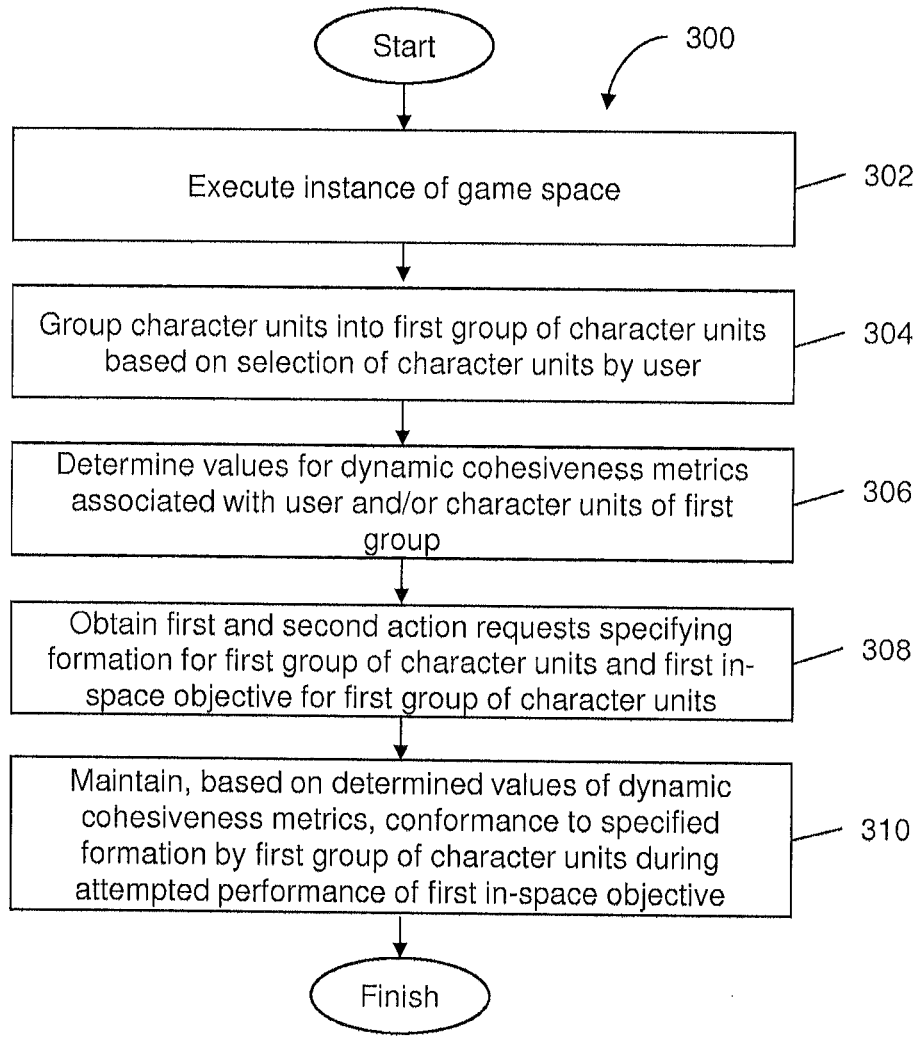
FIG. 3 illustrates a method for facilitating metric-based conformance by character units to specified formations, in accordance with one or more implementations.

FIG. 3 illustrates a method for facilitating metric-based conformance by character units to specified formations, in accordance with one or more implementations. The operations of method 300 presented below are intended to be illustrative. In some implementations, method 300 may be accomplished with one or more additional operations not described, and/or without one or more of the operations discussed. Additionally, the order in which the operations of method 300 are illustrated in FIG. 3 and described below is not intended to be limiting.

In some implementations, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At an operation 302, an instance of a game space may be executed. The game space may include character units that are controllable by a user to perform in-space actions that are selected by the user. Operation 302 may be performed by a game module that is the same as or similar to game module 106, in accordance with one or more implementations.

At an operation 304, one or more of the character units may be grouped into a first group of character units based on a selection of the first group of character units by the user. Operation 304 may be performed by a game module that is the same as or similar to game module 106, in accordance with one or more implementations.

At an operation 306, values for one or more dynamic cohesiveness metrics associated with one or more of the user or character units of the first group may be determined. For example, the dynamic cohesiveness metrics may include one or more of experience, fatigue, loyalty, morale, or happiness. Operation 306 may be performed by a character unit manager module that is the same as or similar to character unit manager module 108, in accordance with one or more implementations.

At an operation 308, a first action request that specifies a formation for the first group of character units and a second action request that specifies a first in-space objective for the first group of character units may be obtained. Operation 308 may be performed by a communication module that is the same as or similar to communication module 110, in accordance with one or more implementations.

At an operation 310, conformance to the specified formation by the first group of character units during an attempted performance of the first in-space objective may be maintained based on the determined values of the dynamic cohesiveness metrics. For example, the first group of character units may attempt to perform the first in-space objective in the instance of the game space with a level of conformance to the specified formation during the attempted performance of the first in-space objective. The level of the conformance to the specified formation may be based on the determined values of the dynamic cohesiveness metrics. Operation 310 may be performed by a game module that is the same as or similar to game module 106, in accordance with one or more implementations.

In certain implementations, definitions of one or more formations may be managed. The definitions may include first and second definitions. The first definition may indicate a first difficulty level associated with conforming to the specified formation. The second definition may indicate a second difficulty level associated with conforming to another formation that is different from the first difficulty level. In some implementations, the conformance to the specified formation may be maintained for the first group of character units based on the first difficulty level.

In various implementations, the definitions may be managed such that the first definition indicates one or more of positions, spacing, or angles of character units of the first group with respect to one another. In some implementations, the conformance to the specified formation may be maintained for the first group of character units based on one or more of the positions, the spacing, or the angles. Maintenance of the conformance to the specified formation may be performed by a game module that is the same as or similar to game module 106, in accordance with one or more implementations. Management of the definitions may be performed by a formation manager module that is the same as or similar to formation manager module 112.

Figure 4:
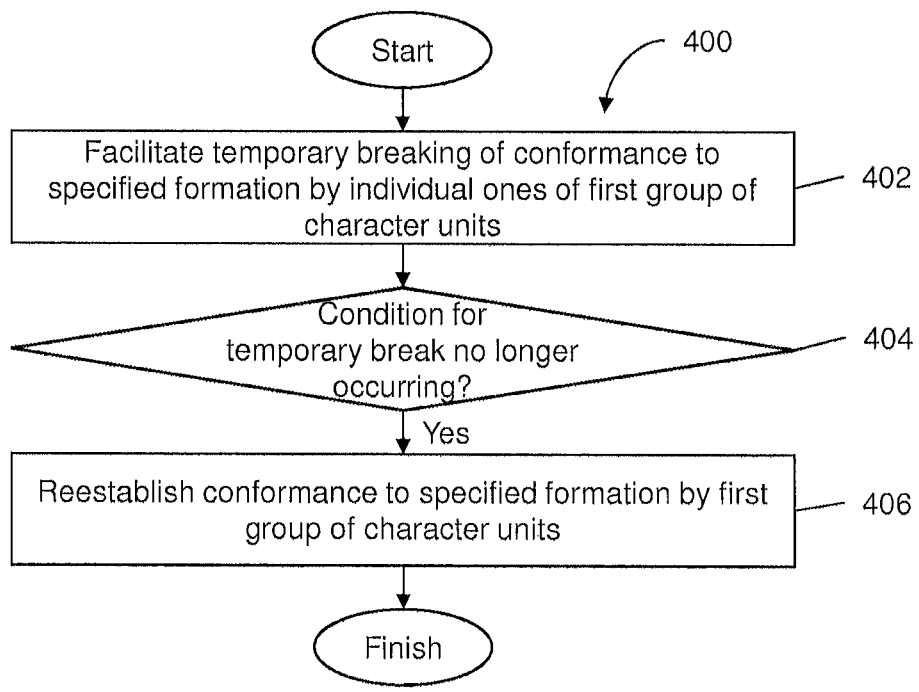
FIG. 4 illustrates a method for facilitating temporary breaking of conformance to specified formations, in accordance with one or more implementations.

FIG. 4 illustrates a method for facilitating temporary breaking of conformance to specified formations, in accordance with one or more implementations. The operations of method 400 presented below are intended to be illustrative. In some implementations, method 400 may be accomplished with one or more additional operations not described, and/or without one or more of the operations discussed. Additionally, the order in which the operations of method 400 are illustrated in FIG. 4 and described below is not intended to be limiting.

In some implementations, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

At an operation 402, temporary breaking of the conformance to the specified formation by individuals ones of the first group of character units may be facilitated. In some implementations, the temporary breaking of the conformance to the specified formation may be based on one or more of a terrain type encountered by the first group of character units, an objective type of the first in-space objective, a sub-objective of the first in-space objective, an effect on the first group of character units, a new objective assigned to a character unit of the first group, or proximity to a target of the first group of character units. Operation 402 may be performed by a game module that is the same as or similar to game module 106, in accordance with one or more implementations.

At an operation 404, a determination of whether one or more conditions that triggered the temporary breaking of the conformance to the specified formation are no longer occurring may be effectuated. By way of example, the first group of character units may have already traveled past a terrain type that initially triggered the temporary breaking when the terrain type was encountered. As such, the terrain type currently does not affect the first group of character units. Operation 404 may be performed by a game module that is the same as or similar to game module 106, in accordance with one or more implementations. Responsive to a determination that the conditions triggering the temporary breaking are over, method 400 may proceed to an operation 406.

At operation 406, the conformance to the specified formation by the first group of character units may be reestablished. Operation 406 may be performed by a game module that is the same as or similar to game module 106, in accordance with one or more implementations.

Although the present invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any implementation can be combined with one or more features of any other implementation.

What is claimed is:

1. A system for facilitating metric-based conformance by character units to known formations, the system comprising:
   at least one input device configured to enable a user to perform in-space actions; and
   one or more processors configured to execute computer program modules, the computer program modules comprising:
   a game module configured to execute an instance of a game space, the game space including a plurality of character units that are controllable by a user to perform in-space actions that are selected by the user, via the at least one input device, wherein the plurality of character units includes a first group of character units;
   a character unit manager module configured to determine a plurality of values for a dynamic cohesiveness metric associated with the first group of character units, wherein the dynamic cohesiveness metric dynamically changes over time based on gameplay within the game space; and
   a communication module configured to obtain, from the user, via the at least one input device, said in-space actions, wherein said in-space actions include at least a first action request specifying a first in-space objective for the first group of character units,
   wherein the game module is further configured to, responsive to reception of the first action request, cause the first group of character units to attempt performance of the first in-space objective in the instance of the game space with a level of conformance based on a predetermined formation during the attempted performance of the first in-space objective, the level of conformance being based on the determined plurality of values of the dynamic cohesiveness metric associated with the first group of character units.

2. The system of claim 1, wherein the game module is further configured such that grouping of the plurality of character units is user selectable, via the at least one input device, and such that one or more of the plurality of character units are grouped into the first group of character units based on a selection of the first group of character units by the user.

3. The system of claim 1, wherein the game module is further configured to maintain, based on the determined plurality of values of the dynamic cohesiveness metric, the conformance to the predetermined formation by the first group of character units during the attempted performance of the first in-space objective.

4. The system of claim 1, wherein the dynamic cohesiveness metric includes one or more of experience, fatigue, loyalty, morale, or happiness.

5. The system of claim 1, wherein the game module is further configured to facilitate temporary breaking of the conformance to the predetermined formation by individuals ones of the first group of character units.

6. The system of claim 5, wherein the temporary breaking of the conformance to the predetermined formation is based on one or more of a terrain type encountered by the first group of character units, an objective type of the first in-space objective, a sub-objective of the first in-space objective, an effect on the first group of character units, a new objective assigned to a character unit of the first group, or proximity to a target of the first group of character units.

7. The system of claim 1, wherein the computer program modules further comprise a formation manager module configured to manage definitions of one or more formations, wherein the definitions include first and second definitions, the first definition indicates a first difficulty level associated with conforming to the predetermined formation, and the second definition indicates a second difficulty level associated with conforming to another predetermined formation that is different from the first difficulty level, and wherein the game module is configured such that the conformance to the specified formation is maintained for the first group of character units based on the first difficulty level.

8. The system of claim 7, wherein the formation manager module is configured such that the first definition indicates one or more of positions, spacing, or angles of character units with respect to one another for the predetermined formation, and wherein the game module is configured such that the conformance to the predetermined formation is maintained for the first group of character units based on one or more of the positions, the spacing, or the angles.

9. A method for facilitating metric-based conformance by character units to known formations, the method being implemented in a computer system that includes at least one input device configured to enable a user to perform in-space actions and one or more processors configured to execute computer program modules, the method comprising:
   executing an instance of a game space, the game space including a plurality of character units that are controllable by a user to perform in-space actions that are selected by the user, via the at least one input device, wherein the plurality of character units includes a first group of character units;
   determining a plurality of values for a dynamic cohesiveness metric associated with the first group of character units, wherein the dynamic cohesiveness metric dynamically changes over time based on game play within the game space; and obtaining, from the user, via the at least one input device, said in-space actions, wherein said in-space actions include a first action request specifying a first in-space objective for the first group of character units, wherein, responsive to reception of the first action request, cause the first group of character units to attempt performance of the first in-space objective in the instance of the game space with a level of conformance based on the predetermined formation according during the attempted performance of the first in-space objective, the level of conformance being based on the determined plurality of values of the dynamic cohesiveness metric associated with the first group of character units.

10. The method of claim 9, wherein grouping of the plurality of character units is user selectable, via the at least one input device, the method further comprising grouping one or more of the plurality of character units into the first group of character units based on a selection of the first group of character units by the user.

11. The method of claim 9, further comprising maintaining, based on the determined plurality of values of the dynamic cohesiveness metric, the conformance to the predetermine formation by the first group of character units during the attempted performance of the first in-space objective.

12. The method of claim 9, wherein the dynamic cohesiveness metric includes one or more of experience, fatigue, loyalty, morale, or happiness.

13. The method of claim 9, further comprising facilitating temporary breaking of the conformance to the predetermined formation by individuals ones of the first group of character units.

14. The method of claim 13, wherein the temporary breaking of the conformance to the predetermined formation is based on one or more of a terrain type encountered by the first group of character units, an objective type of the first in-space objective, a sub-objective of the first in-space objective, an effect on the first group of character units, a new objective assigned to a character unit of the first group, or proximity to a target of the first group of character units.

15. The method of claim 9, further comprising managing definitions of one or more formations, wherein the definitions include first and second definitions, the first definition indicates a first difficulty level associated with conforming to the predetermined formation, and the second definition indicates a second difficulty level associated with conforming to another predetermined formation that is different from the first difficulty level, and wherein the conformance to the specified formation is maintained for the first group of character units based on the first difficulty level.

16. The method of claim 15, wherein the first definition indicates one or more of positions, spacing, or angles of character units with respect to one another for the predetermined formation, and wherein the conformance to the predetermined formation is maintained for the first group of character units based on one or more of the positions, the spacing, or the angles.

* * * * *